(12) United States Patent
Chapman et al.

(10) Patent No.: US 10,963,617 B1
(45) Date of Patent: Mar. 30, 2021

(54) MODIFYING ROUTE TOPOLOGY TO FIX CLOCK TREE VIOLATIONS

(71) Applicant: Cadence Design Systems, Inc., San Jose, CA (US)

(72) Inventors: Andrew Mark Chapman, Milton (GB); William Robert Reece, Over (GB); Natarajan Viswanathan, Austin, TX (US); Mehmet Can Yildiz, Austin, TX (US); Gracieli Posser, Austin, TX (US); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/735,658

(22) Filed: Jan. 6, 2020

(51) Int. Cl.
  *G06F 30/00* (2020.01)
  *G06F 30/396* (2020.01)
  *G06F 30/398* (2020.01)
  *G06F 30/20* (2020.01)
  *G06F 30/394* (2020.01)

(52) U.S. Cl.
  CPC ............ *G06F 30/396* (2020.01); *G06F 30/20* (2020.01); *G06F 30/394* (2020.01); *G06F 30/398* (2020.01)

(58) Field of Classification Search
  CPC ...... G06F 30/396; G06F 30/394; G06F 30/20; G06F 30/398
  See application file for complete search history.

(56) References Cited

U.S. PATENT DOCUMENTS

| 6,536,024 | B1* | 3/2003 | Hathaway | G06F 1/10 327/295 |
| 6,591,411 | B2* | 7/2003 | Alpert | G06F 30/327 716/129 |
| 6,754,876 | B2* | 6/2004 | Sasaki | G06F 30/39 716/119 |
| 6,996,512 | B2* | 2/2006 | Alpert | G06F 30/392 703/14 |
| 7,181,664 | B2* | 2/2007 | Lee | G01R 31/318536 714/726 |
| 7,409,657 | B2* | 8/2008 | Miya | G06F 30/327 716/103 |
| 7,653,884 | B2* | 1/2010 | Furnish | G06F 30/392 716/103 |
| 7,752,588 | B2* | 7/2010 | Bose | G06F 30/392 716/122 |
| 8,095,904 | B2* | 1/2012 | Hentschke | H04L 45/00 716/126 |

(Continued)

*Primary Examiner* — Naum Levin
(74) *Attorney, Agent, or Firm* — Schwegman Lundberg & Woessner, P.A.

(57) ABSTRACT

Aspects of the present disclosure address systems and methods for fixing clock tree design constraint violations. An initial clock tree is generated. The generating of the initial clock tree comprises routing a clock net using an initial value for a parameter that controls a priority ratio between total route length and a maximum source-to-sink route length in each net of the clock tree. A violation to a clock tree design constraint is detected in the clock net in the clock tree, and based on detecting the violation, a rerouting candidate is generated by rerouting the clock net using an adjusted value for the parameter. A target clock tree is selected based on a comparison of timing characteristics of the rerouting candidate with the clock tree design constraint.

20 Claims, 5 Drawing Sheets

(56) References Cited

U.S. PATENT DOCUMENTS

| | | | | |
|---|---|---|---|---|
| 8,875,075 B2* | 10/2014 | Kennedy | ............... | G06F 30/39 |
| | | | | 716/110 |
| 8,966,425 B1* | 2/2015 | Eisenstadt | ............. | G06F 30/394 |
| | | | | 716/120 |
| 9,003,344 B2* | 4/2015 | Kennedy | ............... | G06F 30/398 |
| | | | | 716/110 |
| 9,785,738 B1* | 10/2017 | Alpert | ..................... | G06F 30/18 |
| 10,102,328 B1* | 10/2018 | Liu | ....................... | G06F 30/394 |
| 10,380,287 B1* | 8/2019 | Meyer | .................... | G06F 30/396 |
| 10,402,533 B1* | 9/2019 | Reece | ................... | G06F 30/394 |
| 10,460,066 B1* | 10/2019 | Posser | .................. | G06F 30/394 |
| 2005/0120318 A1* | 6/2005 | Goko | ..................... | G06F 30/30 |
| | | | | 716/113 |
| 2007/0237097 A1* | 10/2007 | Maharana | ............ | H04L 12/462 |
| | | | | 370/255 |

\* cited by examiner

US 10,963,617 B1

MODIFYING ROUTE TOPOLOGY TO FIX CLOCK TREE VIOLATIONS

TECHNICAL FIELD

The present disclosure generally relates to the technical field of integrated circuit (IC) design. In particular, the present disclosure addresses systems and methods for modifying a route topology to fix clock tree violations.

BACKGROUND

An IC layout specifies portions of various components of an IC. When the IC is to include a large number of registers, latches, flip-flops, and/or other types of clocked devices ("sinks") that are to be clocked by one or more clocks, the IC must include one or more clock trees for delivering the clock signal from the clock source to all of the sinks to be clocked by it. A clock tree distributes a clock signal from its root to a set of sinks within an IC through a branching network of drivers (e.g., buffers or inverters). A single driver distributes the clock signal to a grouping of other drivers and/or sinks. Connectivity between a driver and its fanout is referred to as a a "clock net" and will be physically implemented by routed wires.

Electronic design automation (EDA) software systems commonly perform clock-tree synthesis (CTS). Conventional approaches to CTS include building a clock tree while avoiding violations to clock tree design constraints that impose constraints on certain design characteristics. Common clock tree design constraint violations include slew, maximum insertion delay, and timing closure violations. During CTS, clock buffers are placed and routed to transmit the clock signal. Resulting routes in the clock tree may be unbalanced. For example, a first portion of a route connecting a source to a first sink may be short while a second portion of the route that connects the source to a second sink may be long. The longer portion of the route can result in both a worse transition time and a worse delay, thereby causing a clock tree design constraint violation.

For runtime reasons, clock trees are initially implemented using estimates. The accuracy is increased as the clock trees are refined. Refining an initial clock tree can result in new violations appearing. For example, clock nets that were close to clock tree design constraint targets previously are pushed over target (creating a violation). One example of accuracy increase is a congestion update where the whole design routing is re-evaluated. This may reveal highly congested regions that in turn result in an increased capacitance for clock nets in that region. An increased capacitance can slow down the clock signal (larger capacitor is slower to charge), thereby resulting in transition-time and delay violations. These clock tree design constraint violations (also referred to as "clock tree violations") must be corrected and are often done so as part of CTS.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
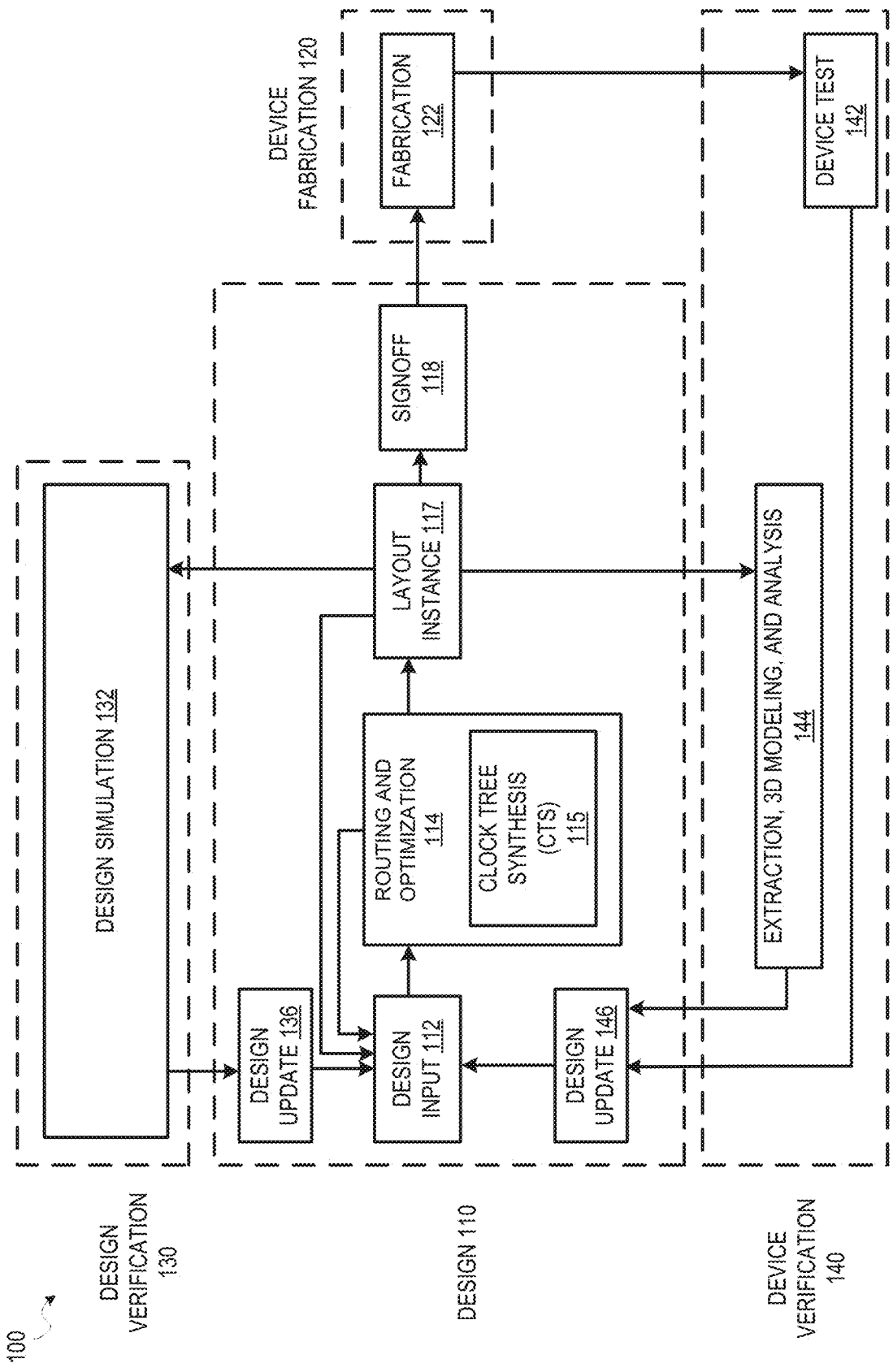
FIG. 1 is a diagram illustrating an example design process flow that includes fixing clock tree violations by modifying route topologies, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Routing of a clock tree during CTS is guided by a parameter that controls a trade-off between a total route length and a maximum source-to-sink route length. As an example, input values for the parameter may be between 0 and 1 where 0 produces a minimum total length to connect all terminals and 1 produces a minimum source-to-sink length. In some embodiments, the trade-off between total route length and maximum source-to-sink route length corresponds to a trade-off between Prim's algorithm and Dijkstra's algorithm. A parameter value of 0 produces the best total wirelength, although at least one driven terminal will likely have a long source-to-sink length that causes slew and/or delay violations to a subset of driven terminals. A parameter value of 1 produces the worst total wirelength that is likely to result in over-congestion, which makes routing difficult although no single driven terminal is highly penalized.

As noted above, CTS often involves fixing clock tree design constraint violations in a clock tree, which are also referred to as "clock tree violations." Upon detecting a violation (e.g., transition time or long path) in the clock tree, conventional approaches include increasing the strength of the buffer driving the net, which has both an area and a power cost associated with it. Another approach includes adding a buffer part way along the violating net, which also has both an area and a power cost and can result in an unbalanced network if the buffer drives some but not all of the driven terminals of the original net. This additional unbalancing can result in a transition time violation (ideally clock sinks all receive the clock signal at the same time). Yet another approach includes moving the buffers (source or sink) on the long path closer to each other. This is free in terms of area and power but has the cost of increasing the wirelength of the net on the other side of the moved buffer. This can result in a longer route and a new violation on another clock net, which may create a violation that is even worse than the violation being fixed.

Aspects of the present disclosure address problems with the conventional approaches to fixing clock tree design constraint violations in clock trees, among others, with an integrated circuit (IC) design process that includes rerouting violating clock nets in a clock tree using adjusted values for the parameter that controls the ratio of total route length to source-to-sink route length. Consistent with some embodiments, a method includes detecting a clock tree design constraint violation in a clock net of an initial clock tree generated using an initial value for the parameter that controls the ratio of total route length to source-to-sink route length. Based on detecting the clock tree design constraint violation, one or more rerouting candidates are generated by rerouting the clock net using adjusted values for the parameter. Adjusting the parameter values results in modified clock trees that have different total route lengths and source-to-sink route lengths. For example, upon detecting a clock tree design constraint violation in a clock net of an initial clock tree, the clock net may be rerouted to have an increased total route length and a decreased maximum source-to-sink route length compared to that route in the initial clock tree.

The generating of rerouting candidates is iteratively performed such that the parameter value is adjusted (e.g., increased or decreased) at each iteration. Once a rerouting candidate is generated, the method includes determining whether the rerouting candidate fixes the clock tree design constraint violation. If the rerouting candidate corrects the clock tree design constraint violation, the rerouting candidate is selected and used to update the violating route in the initial clock tree. If the rerouting candidate does not fix the clock tree design constraint violation, another iteration is performed where another rerouting candidate is generated using a further adjusted parameter value. In this manner, the method may include generating a set of rerouting candidates for the violation clock net. If none of the rerouting candidates fix the clock tree design constraint violation, the rerouting candidate that provides the greatest reduction to the clock tree design constraint violation is selected and used to update the initial clock tree. If none of the rerouting candidates provided reduce the clock tree design constraint violation, the initial clock tree is used. This approach to fixing clock tree design constraint violations in a clock tree provides the advantage of being a lock in-place optimization that does not impact other parts of the clock tree while also avoiding incursion of additional area and power costs in the resulting clock trees.

FIG. 1 is a diagram illustrating an example design process flow 100 that includes clock tree wirelength reduction based on target offsets in connected routes, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. While the design process flow 100 shows the routing and optimization 114 operation occurring prior to a layout instance 117, routing, timing analysis, and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

As shown, the routing and optimization 114 operation includes a CTS 115 operation, which may be performed in accordance with various embodiments described herein. The CTS 115 operation can generate a clock tree that delivers a clock signal from a clock tree root, which comprises a clock source of a circuit design, to a plurality of clock tree leaf nodes, which comprises a plurality of clock tree sinks within the circuit design. According to various embodiments, the clock tree generation performed as part of the CTS 115 operation includes placing clock drivers at various regions of the IC design based on satisfaction of a set of clock tree design constraints, which can include slew, latency, and power consumption by the generated clock tree. Each clock driver delivers the clock signal to a set of clock sinks and/or a set of clock drivers. A clock net of the IC design corresponds to interconnections between a clock driver and the clock sinks and drivers that are driven by the clock driver. Any one of the clock sources, sinks, and drivers may be referred to herein as a "clock tree instance."

An initial clock tree is constructed, for example, using the Steiner-tree approach. With the Steiner-tree approach, a minimum rectilinear Steiner tree (MRST) is used for routing a multi-pin clock net with minimum wirelength. Given m points in the plane, an MRST connects all points by rectilinear lines, possibly via some extra points (called Steiner points), to achieve a minimum-wire-length tree of rectilinear edges. It shall be appreciated that the Steiner-tree approach is merely an example of the approach used to construct the initial clock tree, and in other embodiments, one of several known clock tree construction techniques may be used to construct the initial clock tree.

As noted above, routing of a clock tree during CTS is guided by a parameter that controls a ratio between a total route length and a maximum source-to-sink route length. This ratio may correspond to a trade-off between Prim's algorithm and Dijkstra's algorithm. As an example, input values for the parameter may be between 0 and 1 where 0 produces a minimum total length to connect all driven terminals and 1 produces a minimum source-to-sink length. In generating the initial clock tree, an initial value (e.g., a default value such as 0.3) is used. Upon detecting a clock tree design constraint violation in a clock net of the clock tree, one or more rerouting candidates are generated by rerouting the clock net using adjusted values for the parameter. Adjusting the parameter values can result in modifications to the violating route in the clock tree thereby producing a modified clock tree with a different total route length and a source-to-sink route lengths than the initial clock tree.

The generating of rerouting candidates is iteratively performed such that the parameter value is adjusted (e.g., increased or decreased) at each iteration. In this manner, a set of rerouting candidates may be generated to correct the clock tree design constraint violation. At each iteration, it is determined whether the rerouting candidate corrects the clock tree design constraint violation, and if so, the initial clock tree is updated based on the rerouting candidate and the process moves to the next violation.

If the rerouting candidate does not fix the clock tree design constraint violation, another iteration is performed where another rerouting candidate is generated using a further adjusted parameter value. If none of the rerouting candidates fix the clock tree design constraint violation, the rerouting candidate that provides the greatest reduction to the clock tree design constraint violation is selected and used to update the initial clock tree. If none of the rerouting candidates provided reduce the clock tree design constraint violation, the original route from the initial clock tree is used.

After design inputs are used in the design input 112 operation to generate a circuit layout, and any of the routing and optimization 114 operations are performed, a layout is generated in the layout instance 117. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations and layout modifications generated based on actual device performance.

A design update 136 from the design simulation 132 operations; a design update 146 from the device test 142 operations or the extraction, 3D modeling, and analysis 144 operations; or the design input 112 operation may occur after the initial layout instance 117 is generated. In various embodiments, whenever design inputs are used to update or change an aspect of a circuit design, a timing analysis and the routing and optimization 114 operation may be performed.

Figure 2:
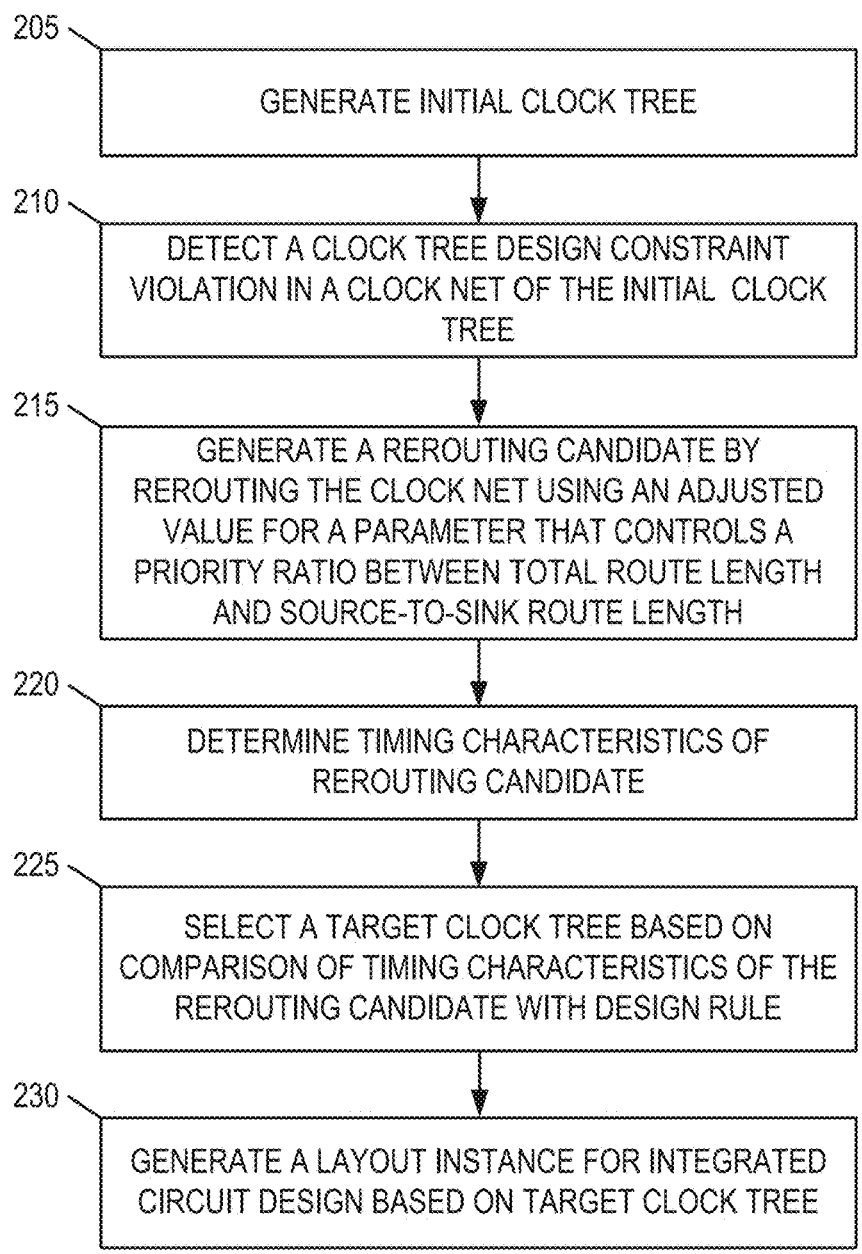
FIGS. 2 and 3 are flowcharts illustrating operations of a method for fixing clock tree violations by modifying route topologies, according to some example embodiments.
Figure 3:
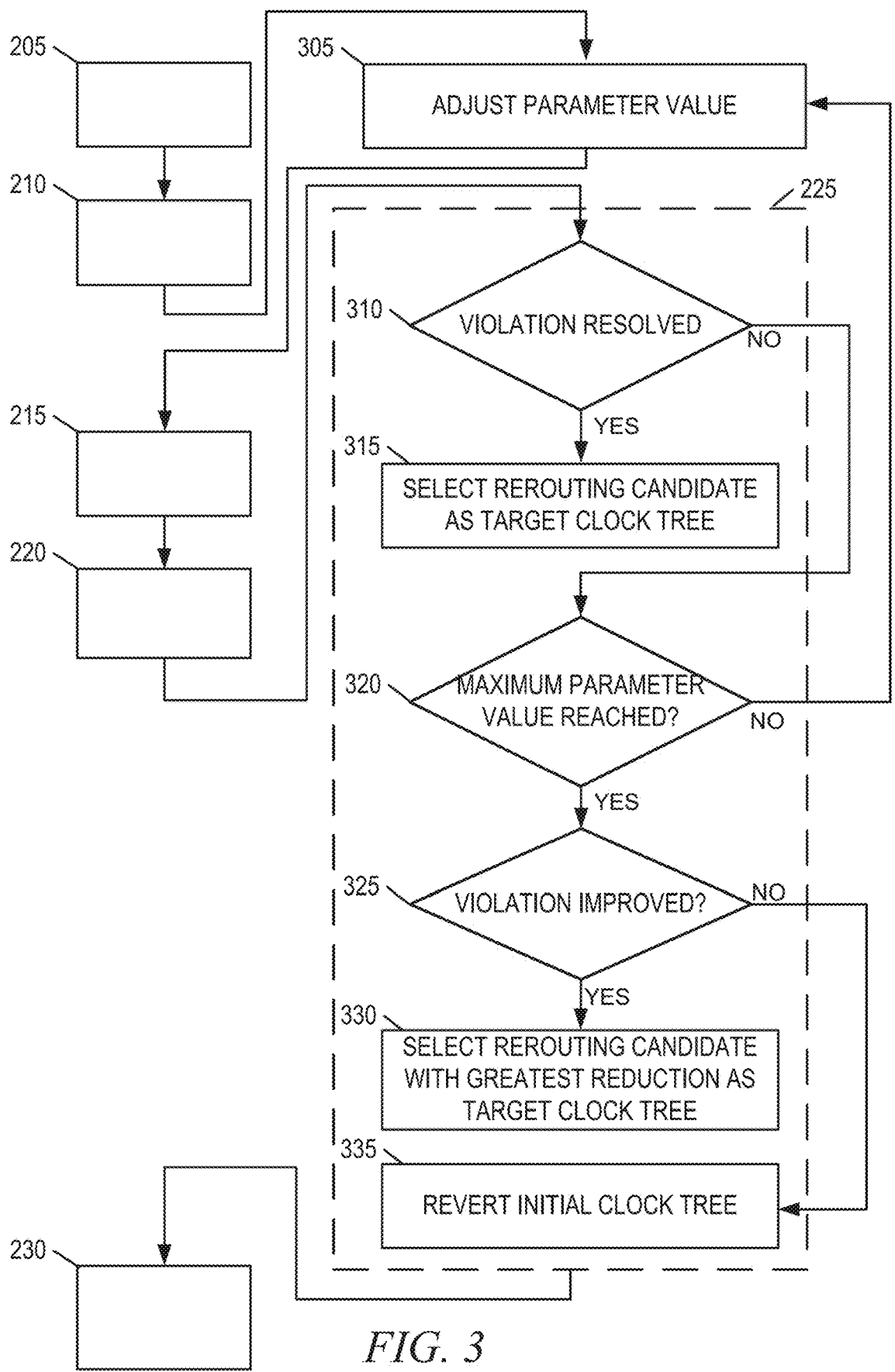

FIGS. 2 and 3 are flowcharts illustrating operations of a method 200 for fixing clock tree violations, according to some example embodiments. For some embodiments, the method 200 is performed as part of a CTS process applied to a circuit design (e.g., by an EDA software system).

It will be understood that the method 200 may be performed by a device, such as a computing device executing instructions of an EDA software system. For instance, the operations of the method 200 may be represented by executable instructions (e.g., EDA software) that, when executed by a processor of a computing device, cause the computing device to perform the method 200. Thus, an operation of the method 200 may be performed by a hardware processor (e.g., central processing unit or graphics processing unit) of a computing device (e.g., desktop, server, etc.). Accordingly, the method 200 is described below with reference to such a computing device.

Depending on the embodiment, an operation of the method 200 may be repeated in different ways or involve intervening operations not shown. Though the operations of the method 200 may be depicted and described in a certain order, the order in which the operations are performed may vary among embodiments, including performing certain operations in parallel.

The method 200 as illustrated begins at operation 205 where the computing device generates an initial clock tree comprising routes that interconnect terminals of clock tree instances (e.g., a buffer, inverter, clock gate, or clock logic) of one or more clock nets in a netlist of an integrated circuit (IC) design. The computing device may access the IC design from memory. Consistent with some embodiments, the clock tree may be generated by building a balanced clock tree that distributes a clock signal to all sinks along roughly similar length paths.

In generating the initial clock tree, the computing device uses a routing algorithm (e.g., Prim, Dijkstra, or Prim-Dijkstra) that includes a parameter that controls a priority ratio between a total length of routes in the clock tree and source-to-sink route length. The value used for the parameter values may, for example, be between 0 and 1. The computing device uses an initial value for the parameter in generating the initial clock tree. The initial value may comprise a default value (e.g., 0.3) or a user-specified value. The initial value for the parameter results in the initial clock tree having a first total route length and a first source-to-sink route length for each driven terminal (each sink) in each route.

At operation 210, the computing device detects a violation to a clock tree design constraint in a clock net of the clock tree. For example, the computing device may determine timing characteristics of each clock net in the clock tree such as transition time and delay and based on the determined timing characteristics, the computing device may determine that the clock net violates the clock tree design constraint. For example, the computing device may determine that the transition time of the clock tree violates a transition time constraint. That is, the computing device may determine that the transition time of the initial clock tree exceeds a transition time threshold established by a transition time constraint. As another example, the computing device may determine that the delay of the clock tree violates a delay constraint (e.g., that the delay of the initial clock tree exceeds a delay threshold established by a delay constraint).

Figure 4B:
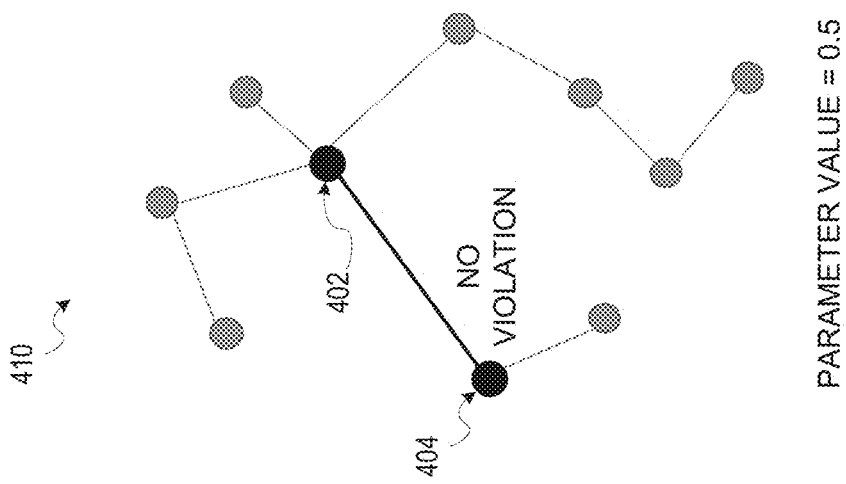
FIGS. 4A and 4B is a conceptual diagram illustrating a process for fixing clock tree violations by modifying route topologies, according to some example embodiments.
Figure 4A:
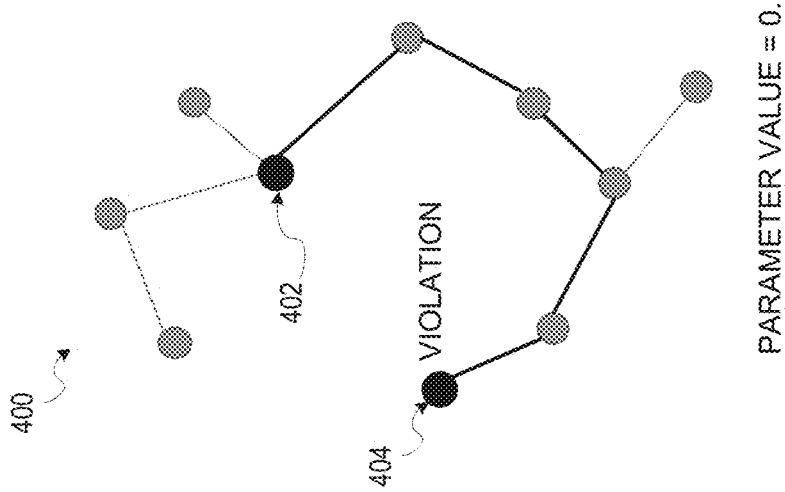

As an example, FIG. 4A illustrates a clock net 400 in an initial clock tree. The clock net comprises a route that connects terminals of clock tree instances. The route allows a clock signal to be transmitted from a route source 402 (a driving terminal) to route sinks (driven terminals). The computing device generates the clock net 400 by routing the clock tree instances using an initial value of 0.3 for the parameter that controls the priority ratio between total route length and maximum source-to-sink route length. The initial value for the parameter results in a long path between route sink 404 and route source 402, which causes a clock tree design constraint violation.

Returning to FIG. 2, at operation 215, the computing device generates a rerouting candidate comprising a modified clock tree based on detecting the violation in the clock net. Consistent with some embodiments, the generation of the rerouting candidate is further based on determining that a distribution of transition time or delay values in the clock net exceed a threshold distribution of values. The computing device generates the rerouting candidate by rerouting the clock net using an adjusted value for the parameter in the routing algorithm that controls a relative priority given when minimizing one or more of total route length and source-to-sink length of the route. That is, the parameter controls a ratio of priority between the total route in the clock tree and source-to-sink route length. As a result of using the adjusted parameter value, the computing device can generate a modified clock tree comprising a modified route for the clock net that has a second total route length and a second source-to-sink route length where the second total route length is greater than the first total route length and the second total source-to-sink maximum route length is less than the first source-to-sink maximum route length. In other words, the computing device generates a modified clock tree that has a greater total route length and a shorter maximum source-to-sink route length.

The computing device determines timing characteristics of the rerouting candidate, at operation 220. For example, the computing device may determine a slew and delay of the rerouted clock net.

At operation 225, the computing device selects a target clock tree based on a comparison of the timing characteristics of the rerouting candidate with the clock tree design constraint violated by the initial clock tree. In some instances, the target clock tree comprises a modified clock tree comprising a modified route for the net in which the design violation was detected. In other instances, the target clock tree comprises the initial clock tree. As will be discussed in further detail below, in some instances, the computing device selects the rerouting candidate as the target clock tree, for example, based on the timing characteristics of the target clock tree indicating that the rerouting candidate fixes the clock tree design constraint violation.

To further the example presented above with reference to FIG. 4A, FIG. 4B illustrates a rerouting candidate 410 generated by rerouting the clock net 400. More specifically, the computing device increases the value used for the parameter that controls the ratio of priority between total route length and maximum source-to-sink route length to 0.5. As a result of adjusting the parameter value, the computing device reroutes the clock net with a small increase in total route length and a reduction to the length of the path to route sink 404, thereby fixing the clock tree constraint violation.

With reference back to the method 200, as will also be discussed below, in performing the method 200, the computing device may generate a set of rerouting candidates including the rerouting candidate discussed above. In these instances, the computing device may select the target clock tree from the set of rerouting candidates. In selecting the target clock tree from the set of rerouting candidates, the computing device selects a rerouting candidate that fixes the clock tree design constraint violation using the smallest value for the parameter that controls the ratio between the total length of routes in the clock tree and source-to-sink route length. If no rerouting candidate in the set fixes the clock tree design constraint violation, the computing device may select the rerouting candidate that provides the greatest improvement to the clock tree design constraint violation. If no rerouting candidate provides an improvement, the computing device selects the initial clock tree as the target clock tree.

The computing device, at operation 230, generates a design layout instance for the IC device design based in part on target clock tree. The layout describes the physical layout dimensions of the IC device. The generating of the design layout based on the target clock tree may, for example, comprise modifying a route in the net according to a modified clock tree selected as the target clock tree.

As shown in FIG. 3, the method 200 may, in some embodiments, further include operations 305, 310, 315, 320, 325, 330, and 335. Consistent with these embodiments, the operations 305 may be performed subsequent to operation 210, where the computing device detects a clock tree design constraint violation in the clock net. At operation 305, the computing device adjusts the value for the parameter that controls the priority ratio between the total length of routes in the clock tree and source-to-sink route length. The computing device may adjust the value for the parameter by either incrementing or decrementing the initial value by a predetermined value. For example, 0.3 may be initially used for the parameter, and the computing device may increment the initial value by 0.1 (a predetermined value), thereby producing an adjusted value of 0.4.

As shown in FIG. 3, the operations 310, 315, 320, 325, 330, and 335 may be performed as part of (e.g., as a sub-routine) operation 225 where the computing device selects the target clock tree. Although operations 310, 315, 320, 325, 330, and 335 are described and illustrated as being part of operation 225, it shall be appreciated that any one of more of these operations may be perform independently of operation 225.

The computing device, at operation 310, determines whether the rerouting candidate resolves the clock tree design constraint violation detected at operation 210. The computing device determines whether the rerouting candidate resolves the clock tree design constraint by comparing the timing characteristics of the rerouting candidate to the clock tree design constraint that is violated. For example, the computing device may compare a slew of the clock net in the rerouting candidate with a slew constraint to determine whether the slew of the rerouted clock net satisfies the slew constraint (e.g., whether the slew exceeds a slew threshold). In another example, the computing device may compare a delay of the clock net in the rerouting candidate with a delay constraint to determine whether the delay of the rerouted clock net satisfies a delay constraint (e.g., whether the delay exceeds a delay threshold).

If the computing device determines the rerouting candidate resolves the clock tree design constraint violation, the computing device selects the rerouting candidate as the target clock tree, at operation 315. If the computing devices determines that the rerouting candidate does not resolve the clock tree design constraint violation, the method 200 proceeds to operation 320 where the computing device determines whether the maximum value for the parameter in the routing algorithm has been reached. For example, as noted above, the input values for the parameter may be between 0-1 and thus, the computing device may determine whether the value for the parameter at the current iteration is below 1. If the maximum value for the parameter has not been reached (e.g., if the value for the parameter at the current iteration is less than 1), the method 200 returns to operation 305 where the computing device again adjusts the parameter value (e.g., by further increasing the parameter value), which is used to generate a second rerouting candidate at operation 215. In this manner, in performing the method 200, the computing device may, in some instances, generate a set of rerouting candidates for a clock net by iteratively rerouting the clock net while adjusting the value for the parameter that controls the priority ratio between the total length of routes in the clock tree and source-to-sink route length. That is, at each iteration, the computing device generates a rerouting candidate using a different parameter value, thereby resulting in a variance in maximum total route length and maximum source-to-sink route length among the set of rerouting candidates.

If the maximum value for the parameter has been reached (e.g., if the value for the parameter at the current iteration is 1), the method 200 proceeds to operation 325 where the computing device evaluates the set of rerouting candidates to determine whether any of the rerouting candidates improve the clock tree design constraint violation. That is, the computing device determines whether timing characteristics of any one rerouting candidate provides a reduction to the clock tree design constraint violation. For example, the computing device may determine whether any of the rerouting candidates improve the transition time or the delay of the clock net. If at least one rerouting candidate provides an improvement to the clock tree design constraint violation, the computing device selects the rerouting candidate that provides the greatest reduction to the clock tree design constraint violation as the target clock tree. Hence, the computing device may determine and evaluate timing characteristics of each rerouting candidate in the set of rerouting candidates to determine a degree of improvement provided by the rerouting candidate. The degree of improvement may be based on the difference between a slew or delay of a rerouting candidate with the slew or delay of the clock net in the initial clock tree.

If the computing device determines that no rerouting candidate in the set of rerouting candidates provides an improvement to the clock tree design constraint violation, the computing device selects the initial clock tree as the target clock tree, at operation 335.

Figure 5:
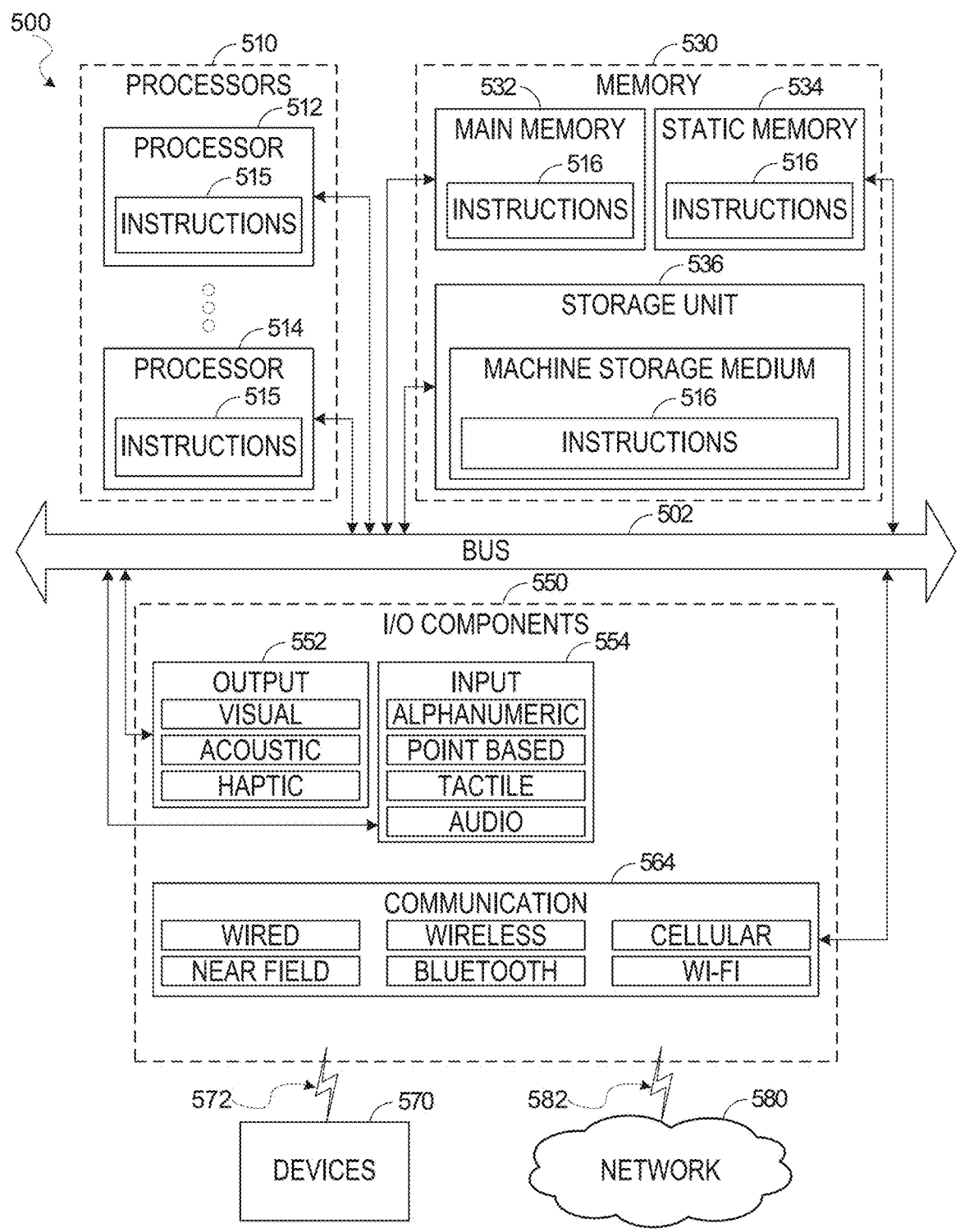
FIG. 5 is a diagrammatic representation of a machine in the example form of a computer system within which a set of instructions for causing the machine to perform any one or more of the methodologies discussed herein may be stored and executed.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute an EDA software system that executes the method 200. Additionally, or alternatively, the instructions 516 may implement FIGS. 1 and 4. The instructions 516 transform the general, non-programmed machine 500 into a particular machine 500 programmed to carry out the described and illustrated functions in the manner described here. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors 510 that may comprise two or more independent processors (sometimes referred to as "cores") that may execute instructions contemporaneously. Although FIG. 5 shows multiple processors, the machine 500 may include a single processor with a single core, a single processor with multiple cores (i.e., a multi-core processor), multiple processors with a single core, multiple processors with multiple cores, or any combination thereof.

The memory 530 may include a main memory 532, a static memory 534, and a storage unit 536, each accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion, and the grouping is in no way limiting. In various example embodiments, the I/O components 550 may include output components 552 and input components 554. The output components 552 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, and other communication components (NFC, Bluetooth, and Wifi) to provide communication via other modalities. The devices 570 may be another machine or any of a wide variety of peripheral devices (e.g., a peripheral device coupled via a universal serial bus (USB)).

Executable Instructions and Machine-Storage Medium

The various memories (e.g., 530, 532, 534, and/or memory of the processor(s) 510) and/or the storage unit 536 may store one or more sets of instructions and data structures (e.g., software) embodying or utilized by any one or more of the methodologies or functions described herein. These instructions, when executed by the processor(s) 510, cause various operations to implement the disclosed embodiments.

The terms "machine-storage medium," "device-storage medium," and "computer storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "transmission medium" discussed below.

Transmission Medium

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., hypertext transfer protocol (HTTP)). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   one or more processors of a machine; and
   a computer storage medium storing instructions, which when executed by the machine, cause the machine to perform operations comprising:
   generating an initial clock tree comprising routes that interconnect clock instances of an integrated circuit (IC) design stored in a memory, the generating of the initial clock tree comprising routing a clock net using an initial value for a parameter that controls a priority ratio between total route length and a maximum source-to-sink route length in the initial clock tree;
   detecting a violation of a clock tree design constraint in the clock net in the initial clock tree;
   based on detecting the violation of the clock tree design constraint, generating a rerouting candidate by rerouting the clock net using an adjusted value for the parameter;
   determining timing characteristics of the rerouting candidate;
   selecting a target clock tree based on a comparison of the timing characteristics of the rerouting candidate with the clock tree design constraint; and
   generating a layout instance of the IC design based in part on the target clock tree, the layout instance describing physical layout dimensions of the IC design.

2. The system of claim 1, wherein the operations further comprise:
   determining the adjusted value by adjusting the initial value by a predetermined value.

3. The system of claim 2, wherein adjusting the initial value comprises one of:
   incrementing the initial value by the predetermined value; or
   decrementing the initial value by the predetermined value.

4. The system of claim 1, wherein:
   the initial clock tree comprises a first total route length for each net and a first maximum source-to-sink route length for the net in which the violation of the clock tree design constraint is detected;
   the target clock tree comprises a second total route length for each net and a second maximum source-to-sink route length for the net in which the violation of the clock tree design constraint is detected;
   the second total route length is greater than the first total route length; and
   the second maximum source-to-sink route length is less than the first maximum source-to-sink route length.

5. The system of claim 1, wherein selecting the target clock tree comprises:
   determining the rerouting candidate resolves the clock tree design constraint violation based on the timing characteristics of the rerouting candidate; and
   selecting the rerouting candidate as the target clock tree based on determining that the rerouting candidate resolves the clock tree design constraint violation.

6. The system of claim 1, wherein:
   the rerouting candidate is a first rerouting candidate; and
   selecting the target clock tree comprises:
   evaluating a set of rerouting candidates comprising at least the first rerouting candidate and a second rerouting candidate;
   detecting the violation to the clock tree design constraint in each of the rerouting candidates in the set of rerouting candidates;
   based on detecting the violation to the clock tree design constraint in each of the rerouting candidates, determining the second rerouting candidate provides the greatest reduction to the violation; and
   selecting the second rerouting candidate as the target clock tree based on determining the second rerouting candidate provides the greatest reduction to the violation.

7. The system of claim 1, wherein:
   the rerouting candidate is a first rerouting candidate; and
   selecting the target clock tree comprises:
   evaluating a set of rerouting candidates comprising at least the first rerouting candidate and a second rerouting candidate;
   detecting the violation to the clock tree design constraint in each of the rerouting candidates;
   determining none of the rerouting candidates improve the violation to the clock tree design constraint; and
   based on determining that none of the rerouting candidates improve the violation to the clock tree design constraint, selecting the initial clock tree as the target clock tree.

8. The system of claim 1, wherein the violation of the clock tree design constraint comprises one of a transition time violation or a delay violation.

9. A method comprising:
   generating an initial clock tree comprising routes that interconnect clock instances of an integrated circuit (IC) design stored in a memory, the generating of the initial clock tree comprising routing a clock net using an initial value for a parameter that controls a priority ratio between total route length and a maximum source-to-sink route length in the initial clock tree;
   based on detecting a violation of a clock tree design constraint in the initial clock tree, generating a rerouting candidate by rerouting the clock net using an adjusted value for the parameter;
   determining timing characteristics of the rerouting candidate;
   selecting a target clock tree based on a comparison of the timing characteristics of the rerouting candidate with the clock tree design constraint; and
   updating the initial clock in the IC design based on the target clock tree.

10. The method of claim 9, further comprising:
    adjusting the initial value by a predetermined value to generate the adjusted value.

11. The method of claim 10, wherein adjusting the initial value comprises one of:

incrementing the initial value by the predetermined value; or decrementing the initial value by the predetermined value.

12. The method of claim 9, wherein:
the initial clock tree comprises a first total route length for each net and a first maximum source-to-sink route length for the net in which the violation of the clock tree design constraint is detected;
the target clock tree comprises a second total route length for each net and a second maximum source-to-sink route length for the net in which the violation of the clock tree design constraint is detected.

13. The method of claim 9, wherein selecting the target clock tree comprises:
determining the rerouting candidate resolves the clock tree design constraint violation based on the timing characteristics of the rerouting candidate; and
selecting the rerouting candidate as the target clock tree based on determining that the rerouting candidate resolves the clock tree design constraint violation.

14. The method of claim 9, wherein:
the rerouting candidate is a first rerouting candidate; and
selecting the target clock tree comprises:
evaluating a set of rerouting candidates comprising at least the first rerouting candidate and a second rerouting candidate;
detecting the violation to the clock tree design constraint in each of the rerouting candidates in the set of rerouting candidates;
based on detecting the violation to the clock tree design constraint in each of the rerouting candidates, determining the second rerouting candidate provides the greatest reduction to the violation; and
selecting the second rerouting candidate as the target clock tree based on determining the second rerouting candidate provides the greatest reduction to the violation.

15. The method of claim 9, wherein the violation of the clock tree design constraint comprises one of a transition time violation or a delay violation.

16. The method of claim 9, comprising generating a layout instance of the IC design based in part on the target clock tree, the layout instance describing physical layout dimensions of the IC design.

17. A computer storage medium storing instructions, which when executed by a machine, cause the machine to perform operations comprising:
generating an initial clock tree comprising routes that interconnect clock instances of an integrated circuit (IC) design stored in a memory, the generating of the initial clock tree comprising routing a clock net using an initial value for a parameter that controls a ratio between total route length and a maximum source-to-sink route length;

detecting a violation of a clock tree design constraint in the clock net in the initial clock tree;
based on detecting the violation of the clock tree design constraint, generating one or more rerouting candidates by rerouting the clock net using one or more adjusted values for the parameter;
determining timing characteristics of the one or more rerouting candidates;
selecting a target clock tree based on a comparison of the timing characteristics of the one or more rerouting candidates with the clock tree design constraint;
modifying the initial clock tree in the IC design based on the target clock tree; and
generating a layout instance of for the IC design based in part on the target clock tree, the layout instance describing physical layout dimensions of the IC design.

18. The computer storage medium of claim 17, wherein:
the initial clock tree comprises a first total route length and a first maximum source-to-sink route length for the net;
the target clock tree comprises a second total route length and a second maximum source-to-sink route length for the net;
the second total route length is greater than the first total route length; and
the second maximum source-to-sink route length is less than the first maximum source-to-sink route length.

19. The computer storage medium of claim 17, wherein selecting the target clock tree comprises:
determining the rerouting candidate resolves the clock tree design constraint violation based on the timing characteristics of the rerouting candidate; and
selecting the rerouting candidate as the target clock tree based on determining that the rerouting candidate resolves the clock tree design constraint violation.

20. The computer storage medium of claim 17, wherein:
the rerouting candidate is a first rerouting candidate; and
selecting the target clock tree comprises:
evaluating a set of rerouting candidates comprising at least the first rerouting candidate and a second rerouting candidate;
detecting the violation to the clock tree design constraint in each of the rerouting candidates in the set of rerouting candidates;
based on detecting the violation to the clock tree design constraint in each of the rerouting candidates, determining the second rerouting candidate provides the greatest reduction to the violation; and
selecting the second rerouting candidate as the target clock tree based on determining the second rerouting candidate provides the greatest reduction to the violation.

* * * * *